United States Patent Office 2,702,820
Patented Feb. 22, 1955

2,702,820

PRODUCTION OF ACYLAMINO CARBOXYLIC ACIDS

Hans Tummes, Duisburg-Meiderich, and Hans Feichtinger, Duisburg-Beeck, Germany, assignors to Ruhrchemie Aktiengesellschaft, Oberhausen-Holten, Germany, a corporation of Germany No Drawing. Application July 3, 1953,
Serial No. 366,068

Claims priority, application Germany July 12, 1952

4 Claims. (Cl. 260—518)

This invention relates to improvements in the production of acylamino carboxylic acids.

One object of this invention is the production of acylamino carboxylic acids from acylated amino carboxylic acid amides. This, and still further objects, will become apparent from the following description.

It has now been found that acylated ω-amino carboxylic acids of the general formula

X—NH(CH₂)ₙ—COOH in which X is an acetyl radical or benzoyl radical and $n$ is a whole number between 1 and 6, may easily be produced if acylated ω-amino carboxylic acid amides of the general formula

X—NH(CH₂)ₙ—CO—NH₂ in which X and $n$ have the aforementioned signification, are treated with water or aqueous ammonia solutions at temperatures of above 100° C. and preferably of 150–170° C. This results in a partial hydrolysis of the acid amide linkage in such a manner that only the CO—NH₂ linkage is cleaved while the X—NH linkage remains unchanged. The ω-amino carboxylic acid amides used as starting material may easily be produced from acylated 1-amino-alkane halides by reacting the same with an ammonium polysulfide solution in accordance with the method disclosed by Willgerodt. (See M. Carmack and M. A. Spielman "The Willgerodt Reaction," Adams Organic Reactions, vol. III, pages 83–107 (1946).)

The conversion, in accordance with the invention, of the ω-amino carboxylic acid amides is effected at a temperature of below 180° C., preferably at 150°–170° C., in order to avoid a splitting-off of the acyl group. The reaction is carried out in pressure-resistant vessels which stand the gas pressure of 10 to 50 kilograms per square centimeter occurring at the reaction temperatures used.

The ratio of acylamino carboxylic acid amide to water or aqueous ammonia may be varied within wide limits in the production of acylamino carboxylic acids in accordance with the invention. In general, 5–15 parts of water or ammonia water are used per part of acid amide. It is preferable in any case to use enough solvent so that the acid amide being treated will dissolve completely in the reaction mixture at the reaction temperature. When using ammonia water, it is of advantage if the latter contains not more than 15% NH₃.

The separation of the ω-amino carboxylic acids produced in accordance with the invention from their aqueous solutions is effected with the use of mineral acids as, for example, hydrochloric acid or sulfuric acid. Upon adding these acids, the free ω-acylamino carboxylic acids separate. Only so much mineral acid is used for the separation that a small excess of free acid remains in the reaction solution. In the hydrolysis of the ω-amino carboxylic acid amides with ammonia water, it is advisable at first to free the reaction solution from excess ammonia by evaporation. The residue from evaporation is dissolved in water and then treated with mineral acid for separation of the acylamino carboxylic acid. The last residues of the acylated amino carboxylic acid may be extracted from the acidified reaction mixture by means of ether.

The acylamino carboxylic acids obtained in accordance with the invention are valuable starting products for numerous organic syntheses.

The following examples are given by way of illustration and not limitation.

Example 1

11.6 grams of aceturic acid amide and 50 cc. of water were heated for 5 hours at 150° C. in a pressure vessel. Thereafter, the reaction solution was evaporated to dryness under vacuum on a water bath. The residue was dissolved in 30 cc. of water and mixed with 10 cc. of concentrated hydrochloric acid which contained approximately 35% HCl. After some time, 7 grams of aceturic acid crystallized from the reaction solution. After purification with water the aceturic acid had a melting point of 205° C.

Example 2

20 grams β-benzoylamino propionic acid amide and 200 cc. of ammonia water which contained 10% NH₃ were heated for 10 hours at 150° C. in a pressure vessel consisting of steel. Thereafter, the reaction solution was evaporated under vacuum on a water bath. The residue was dissolved in 50 cc. of water and mixed with 10 cc. concentrated hydrochloric acid which contained 35% HCl. After some time, 15 grams β-benzoylamino propionic acid which had a melting point of 120° C. crystallized from the solution.

Example 3

10.5 grams of γ-benzoylamino-n-butyric acid amide and 100 cc. of water were heated for 15 hours at 170° C. in a pressure vessel. Thereafter, the reaction solution was evaporated under vacuum on a water bath. The residue was dissolved in 30 cc. of water and acidified with 5 cc. of concentrated hydrochloric acid. The end product was 6 grams of γ-benzoylamino-n-butyric acid having a melting point of 80° C.

Example 4

10 grams δ-benzoylamino-n-valeric acid amide were heated with 100 grams of water for 15 hours at 170° C. in a steel autoclave. To the reaction solution there were added 5–6 grams of concentrated hydrochloric acid (about 30% HCl). Thereby, 7.5 grams of pure δ-benzoylamino-n-valeric acid having a melting point of 103° C. crystallized out.

Example 5

11 grams of ε-benzoylamino-n-caproic acid amide and 100 cc. of ammonia water which contained approximately 12% NH₃ were heated for 15 hours at 160° C. in a pressure vessel consisting of steel. After evaporation of the reaction solution effected at 100° C., there remained a solid residue which was dissolved in 30 cc. of water and mixed with 5 cc. of concentrated hydrochloric acid. 6.5 grams of ε-benzoylamino-n-caproic acid having a melting point of 78° C. were obtained as the end product.

We claim:

1. Process for the production of ω-acylamino carboxylic acid of the general formula

X—NH—(CH₂)ₙ—COOH in which X is a radical from the group consisting of acetyl and benzoyl and $n$ is a whole number between 1 and 6, which comprises heating acylated ω-amino carboxylic acid amides of the general formula

X—NH—(CH₂)ₙ—CONH₂ where X and $n$ have the aforesaid signification, with a member selected from the group consisting of water and aqueous ammonia solutions to a temperature of between 100° and 180° C. at a pressure of 10–50 kg. per square centimeter, and recovering ω acylamino carboxylic acid.

2. Process according to claim 1, in which said heating is effected to a temperature of about 160° to 180° C.

3. Process according to claim 1, in which said acylamino carboxylic acid is recovered by adding a mineral acid to the reaction solution after said heating.

4. Process according to claim 1, in which the aqueous ammonia solution contains approximately 15% NH₃.

No references cited.